No. 781,238. Patented January 31, 1905.

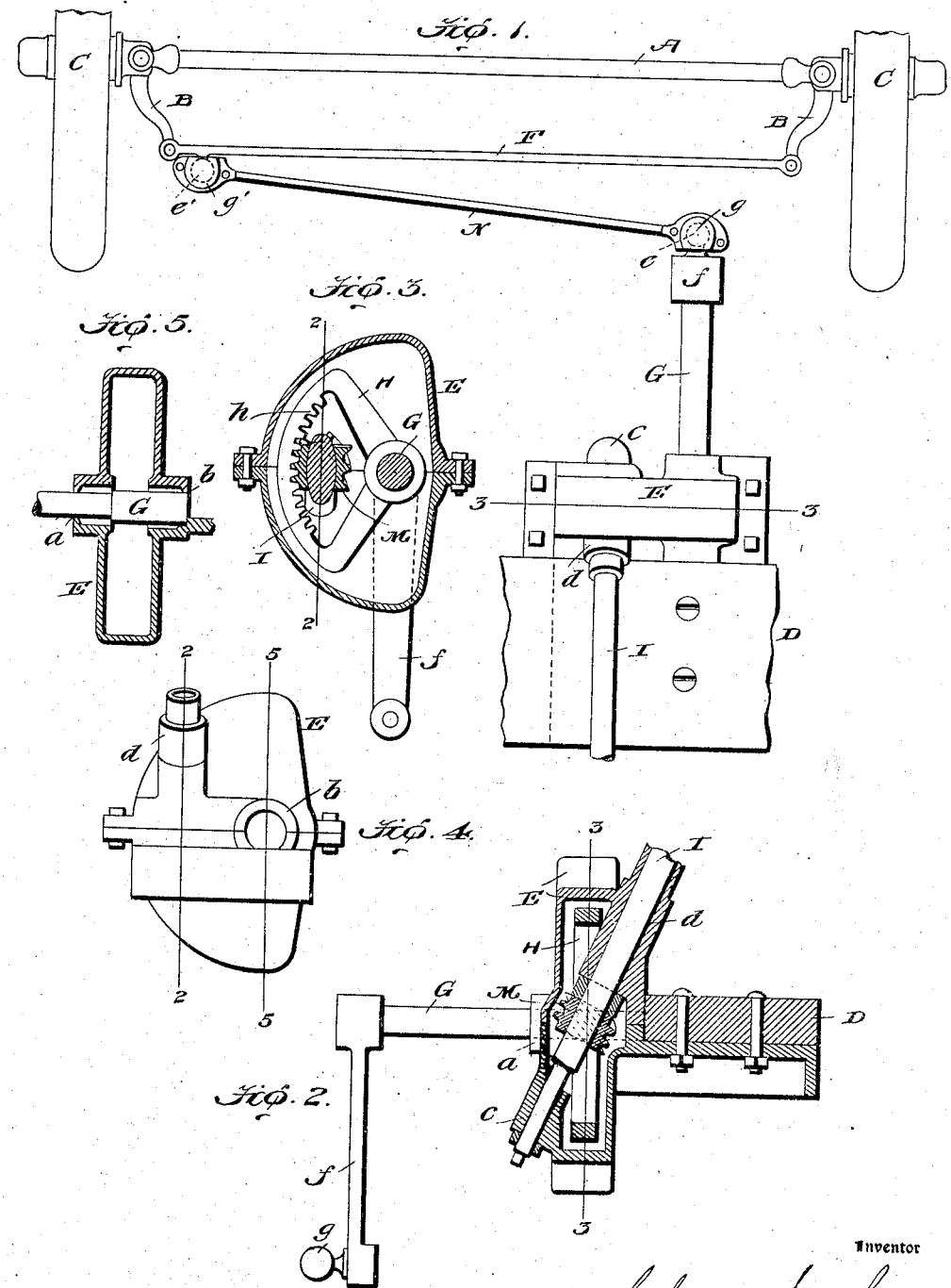

UNITED STATES PATENT OFFICE.

CLEMENT SMITH, OF TOPEKA, KANSAS.

STEERING APPARATUS FOR MOTOR-VEHICLES.

SPECIFICATION forming part of Letters Patent No. 781,238, dated January 31, 1905.

Application filed September 7, 1904. Serial No. 223,651.

*To all whom it may concern:*

Be it known that I, CLEMENT SMITH, a citizen of the United States, residing at Topeka, in the county of Shawnee and State of Kansas, have invented new and useful Improvements in Steering Apparatus for Motor-Vehicles, of which the following is a specification.

My invention pertains to steering apparatus for motor-vehicles; and it has for its object to provide a simple, compact, and durable steering apparatus and one that is self-locking and self-lubricating.

With the foregoing in mind the invention will be fully understood from the following description and claims, when taken in connection with the accompanying drawings, forming part of this specification, in which—

Figure 1 is a top plan view illustrative of the apparatus constituting the present and preferred embodiment of my invention. Fig. 2 is a longitudinal vertical section taken in the plane indicated by the lines 2 2 of Figs. 3 and 4. Fig. 3 is a transverse section taken in the plane indicated by the line 3 3 of Fig. 2. Fig. 4 is a view taken at right angles to Fig. 2 and illustrating the gear-casing in rear elevation, and Fig. 5 is a longitudinal vertical section taken in the plane indicated by the line 5 5 of Fig. 4 and illustrating a portion of the rock-shaft in side elevation.

Similar letters designate corresponding parts in all of the views of the drawings.

Referring to the drawings, A is the rigid front axle of a motor-vehicle. B B are bell-crank knuckles fulcrumed on the axle A, at the ends thereof, and C C are wheels mounted on the outwardly-extending arms of the bell-crank knuckles. All of these parts may be and preferably are of the ordinary construction, as shown; but they may be of any other construction compatible with the purposes of my invention without involving a departure from the scope thereof.

D is a transverse timber designed to be connected to the frame of a motor-vehicle in a position suitable to the best operation of my apparatus.

E is a casing bolted or otherwise fixedly connected to the timber D, Fig. 2, and having horizontal longitudinally-disposed bearings $a$ and $b$, arranged in alinement, Fig. 2, and oblique bearings $c$ and $d$, also arranged in alinement, Figs. 1 and 2.

F is a rod connected to the inner arms of the bell-crank knuckles B and having a ball $e'$ at or adjacent to its end; G, a rock-shaft journaled in the bearings $a$ $b$ of the casing E and having a depending crank $f$, which terminates in a ball $g$, disposed in the socket $e$ of a rod N; H, an open sector fixed on the shaft G within the casing E and having internal spur-teeth $h$, Fig. 3; I, an oblique or inclined shaft journaled in the bearings $c$ $d$ of the casing E, Fig. 2, and designed to be provided at its upper end with a hand-wheel or other suitable handle which I have not deemed it necessary to illustrate, and M a worm-gear fixed on the shaft I within the casing E and intermeshed with the sector-gear H, as best shown in Figs. 2 and 3. The rod N also has a socket $g'$ to receive the ball $e'$.

By reason of the construction described it will be observed that when the shaft I is turned on its axis the shaft G will be rocked, the rods N and F will be moved sidewise, and the wheels C will be swung to carry the vehicle toward the right or the left, according to the direction of movement of said shaft I. It will also be observed that the apparatus is self-locking—*i. e.*, calculated of itself to retain the wheels C in the position in which they are placed relative to the rigid axle A—that the casing E is adapted to protect the intermeshed gears H and M against dust, &c., and at the same time retain lubricant in contact with said gears, and that by reason of the employment of the internally-toothed sector-gear H and the arrangement of the worm-gear M within the said sector-gear the apparatus may be made small and light in proportion to the strength required. The disposition of the worm-gear in the open sector-gear is also materially advantageous, because it permits of the employment of a large sector calculated to afford considerable leverage, and thereby render operation of the apparatus easy.

Because of the necessary inclination of the steering-shaft G the whirls of the spiral of the worm-gear M may be disposed horizontally, and hence spur-teeth, such as shown, may be employed on the sector-gear H. This is advantageous, since the teeth are a considerable distance from the center of the driven shaft, and hence are not liable to be deteriorated by wear after a short period of use. The shaft G, carrying the sector-gear H, may be long or short, as desired, and in connection with the rods N and F it obviously effects a simple, strong, and durable connection between the intermeshed gears and the knuckles carrying the wheels C.

I have entered into a detailed description of the construction and relative arrangement of the parts embraced in the present and preferred embodiment of my invention in order to impart a full, clear, and exact understanding of the said embodiment. I do not desire, however, to be understood as confining myself to such specific construction and relative arrangement of parts, as such changes or modifications may be made in practice as fairly fall within the scope of my invention as claimed.

Having described my invention, what I claim, and desire to secure by Letters Patent, is—

1. In a steering apparatus for motor-vehicles, the combination of one or more wheels, a steering-shaft, an open sector-gear having internal teeth, a connection between said gear and the wheel or wheels for moving the latter by the former, and a worm-gear carried by the steering-shaft and arranged in and intermeshed with the sector-gear.

2. In a steering apparatus for motor-vehicles, the combination of one or more wheels, a casing having bearings, a steering-shaft journaled in said casing, an open sector-gear arranged in the casing and having internal teeth, a connection between said gear and the wheel or wheels for moving the latter by the former, and a worm-gear carried by the steering-shaft and arranged in and intermeshed with the sector-gear.

3. In a steering apparatus for motor-vehicles, the combination of one or more wheels, a rock-shaft, a connection between the rock-shaft and the wheel or wheels for moving the latter by the former, an open sector-gear carried by the rock-shaft and having internal teeth, a steering-shaft, and a worm-gear carried by the steering-shaft and arranged in and intermeshed with the sector-gear.

4. In a steering apparatus for motor-vehicles, the combination of one or more wheels, a casing having bearings, a rock-shaft journaled in the casing and having a crank, rods connecting said crank and the wheel or wheels, an open sector-gear fixed on the rock-shaft within the casing, and having internal teeth, a steering-shaft journaled in the casing, and a worm-gear carried by the steering-shaft and arranged in and intermeshed with the open sector-gear.

In testimony whereof I have hereunto set my hand in presence of two subscribing witnesses.

CLEMENT SMITH.

Witnesses:
L. H. GREENWOOD,
ARTHUR J. McCABE.